Oct. 27, 1925.

W. HERROD-HEMPSALL 1,559,319

HONEY EXTRACTOR

Filed Nov. 3, 1923

Inventor
William Herrod-Hempsall
by Herbert W. Jenner.
Attorney.

Patented Oct. 27, 1925.

1,559,319

UNITED STATES PATENT OFFICE.

WILLIAM HERROD-HEMPSALL, OF LUTON, ENGLAND.

HONEY EXTRACTOR.

Application filed November 3, 1923. Serial No. 672,522.

*To all whom it may concern:*

Be it known that I, WILLIAM HERROD-HEMPSALL, a subject of the King of Great Britain, residing at Luton, England, have invented certain new and useful Improvements in Honey Extractors; and I do hereby declare the following to be a full, clear, and exact description of the invention, such as will enable others skilled in the art to which it appertains to make and use the same.

This invention has reference to honey extractors.

The machines known as honey extractors comprise a cylindrical vessel in which there is mounted to rotate a carrier adapted to receive the honey combs, the arrangement being such that when the carrier is rotated honey is expelled from the cells of the comb by centrifugal force and collects at the bottom of the cylindrical vessel from which it may be drawn as desired through a suitable tap or valve with which the vessel is furnished.

As is well known the honey combs consist of wax cells extending from opposite sides of a mid-rib forming the base of the cells. In beekeeping the combs within a beehive are carried in frames (almost universally made of wood) such frames each consisting of a top bar, a bottom bar and end bars, the top bar being extended beyond the end bars in order to provide lugs which facilitate the handling of the frames and which rest upon suitable supports when the frames are in place within a hive. In order to extract the honey the frames are removed from the hive and the wax capping over the cells is removed from both sides of the combs before placing the combs in the extractor.

The rotatable carriers of the honey extractors in common use are so constructed as to carry the combs with the mid-ribs thereof tangential to the axis of the carrier but this is far from an economical arrangement as it is impossible to provide a machine of this character of reasonable dimensions to extract from more than two or four combs at a time. Furthermore it necessitates two operations, one to extract the honey from one side of the comb and another to extract the honey from the other side thereof, the comb containing frames having to be removed from the extractor after the first operation and replaced therein in a reversed position before the second operation unless, as in some expensive type of machines, the frames are carried in pivoted cages capable of being reversed without removal of the frames from the machine.

The object of the present invention is to provide an efficient honey extractor of simple but strong construction capable of simultaneously extracting honey from both sides of the combs of a relatively large number of honey comb frames.

For this purpose, according to the invention, the combs from which the honey is to be extracted are carried in positions such that the mid-ribs thereof extend in radial vertical planes. As in this position it is only the narrow top bars of the frames that extend tangentially to the axis of the carrier a relatively large number of frames can be received in a machine of comparatively small dimensions.

The rotatable carrier conveniently consists of a skeleton structure embodying a central spindle that carries ring-like members to hold the frames against outward radial movement, a ring or rings on which the lower end bars of the frames rest and positioning means that determine the radial positions of the frames. The positioning means may consist of inwardly projecting lugs on the ring-like members between which lugs the top bars of the frames are received, and recesses in a supporting ring adapted to receive the lower end bars of the frame.

Any usual or appropriate multiplying gear may be provided for rotating the carrier either by hand or power.

The accompanying illustrative drawings show a honey extractor embodying the invention suitable for extracting honey from both sides simultaneously, of twenty combs in one operation.

Figure 1:
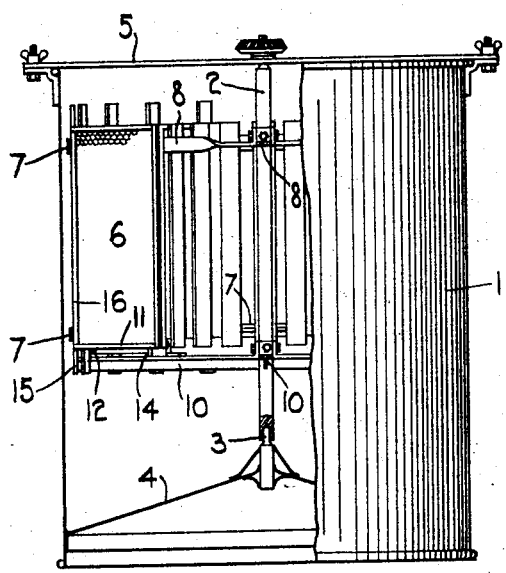
Fig. 1 shows the extractor in sectional elevation, the section corresponding to the line A A of Fig. 2.
Figure 4:
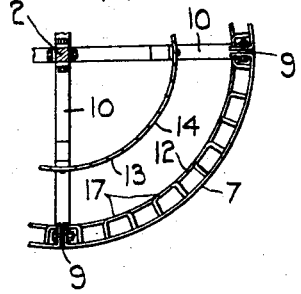
Fig. 4 is a plan of the lower supporting member.
Figure 3:
Fig. 3 is a developed detail view of a portion of the upper supporting ring of the carrier.

As the gear does not form any part of the present invention and can be of any desired character, the same is not illustrated in the drawings.

1 indicates the cylindrical vessel and 2 the central spindle of the carrier mounted to rotate in the said vessel. The lower end of the spindle is formed with an axial recess into which enters a pivot pin 3 fixed to the centre of the conical bottom 4 of the vessel 1. The upper end of the spindle 2 passes through and rotates in a suitable bearing provided therefor in a cross-bar 5 removably fixed to the top of the vessel 1. A suitable driving shaft, not shown, is mounted in bearings carried by the cross-bar 5 and is arranged to rotate the spindle 2 through any appropriate multiplying gear of known or suitable kind.

Figure 5:
Fig. 5 is a developed detail view of a portion of a positioning ring forming a part of the lower supporting member.

The machine illustrated is constructed to receive twenty of the usual shallow frames 6 carrying the honey combs, the frames being held against outward relative movement by metal rings 7, the upper one of which is connected by radial arms 8 to the spindle 2, and the lower one of which is connected to lugs 9 projecting upwardly from the free ends of radial arms 10, of the cross section fixed to the spindle 2. The lower end bars 11 of the frames 6 rest upon a ring 12 of wire fixed to the radial arms 10 and the said bars also rest in recesses 13, see Fig. 5, formed therefor in a metal ring 14 also fixed to the radial arms 10.

As will be seen from Fig. 1 the wire ring 12 is in such position relatively to the lower metal ring 7 that the projecting portions or lugs 15 at the lower ends of the top bars 16 of the frames 6 extend downwardly below the wire ring 12 so that the said ring 12 serves not only to support the frames but also to prevent inward radial movement thereof. The arms 10 and rings 12 and 14 are the portions of the skeleton frame which supports the frames containing the combs, and they permit the honey to drip from the combs into the lower part of the inclosing vessel.

Figure 2:
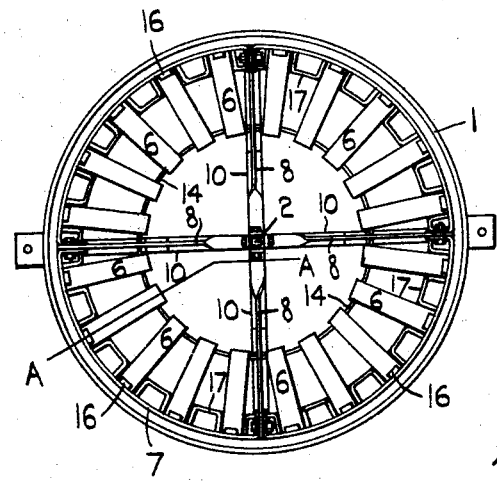
Fig. 2 is a plan of the extractor with the gear removed.

Projecting inwardly from the rings 7 are lugs 17 between which the top bars 16 of the frames are located, these lugs serving in conjunction with the recesses 13 of the ring 14, to position the frames so that they lie in proper radial positions as shown in Fig. 2. In the example illustrated the lugs 17 are formed of lengths of wire bent into U-shape, having their ends riveted or welded into the respective retaining rings 7.

Although the details of construction may be varied without departure from the invention, in the example illustrated the retaining rings 7 are each formed in four segments, the ends of which are bent inwardly and bolted to the free ends of the arms 8, as regards the upper ring, and to the upwardly extending lugs 9 of the arms 10, as regards the lower ring.

The dimensions of the machine illustrated are such that the machine can be used for the extraction of honey from the combs of British or other standard frames as well as from the standard shallow frames shown.

It will be seen that the rotary carrier is of very simple construction. The spindle, radial arms 8 and 10, and parts carried thereby are made of wrought iron, mild steel or the like, preferably galvanized.

Whilst capable of dealing with a large number of frames at one and the same time, the machine is nevertheless very easy to work as the parts are so well balanced; moreover the honey is extracted from the comb very effectively, this being in some measure due to the fact that the cells of the comb incline towards the top bar, namely in a direction which facilitates the honey being ejected outwardly towards the wall of the cylindrical vessel 1.

It will be undertsood that the vessel 1 is provided as usual with a tap or valve at the bottom for drawing off the honey extracted from the combs.

Obviously the machine is not limited to the reception of any particular number of frames, a smaller machine would naturally take less than twenty frames and a larger machine more than twenty.

What I claim is:—

In a centrifugal honey extractor, an inclosing vessel, a vertical driving shaft journaled therein, and a skeleton comb carrier secured on the said shaft and comprising upper radial arms provided with a retaining ring for the comb frames, lower radial arms, a lower retaining ring for the comb frames arranged above the level of the lower arms and secured to them, supporting rings for the comb frames spaced apart and secured to the lower arms below the level of the lower retaining ring and between it and the said shaft, and spacing devices which retain the comb frames in the carrier in positions radial of the said shaft.

In testimony whereof I affix my signature.

WILLIAM HERROD-HEMPSALL.